April 11, 1939. J. J. GOUGH 2,154,043
THERMOSTATICALLY CONTROLLED ELECTRIC HEATING APPLIANCE
Filed Sept. 18, 1937 3 Sheets-Sheet 1
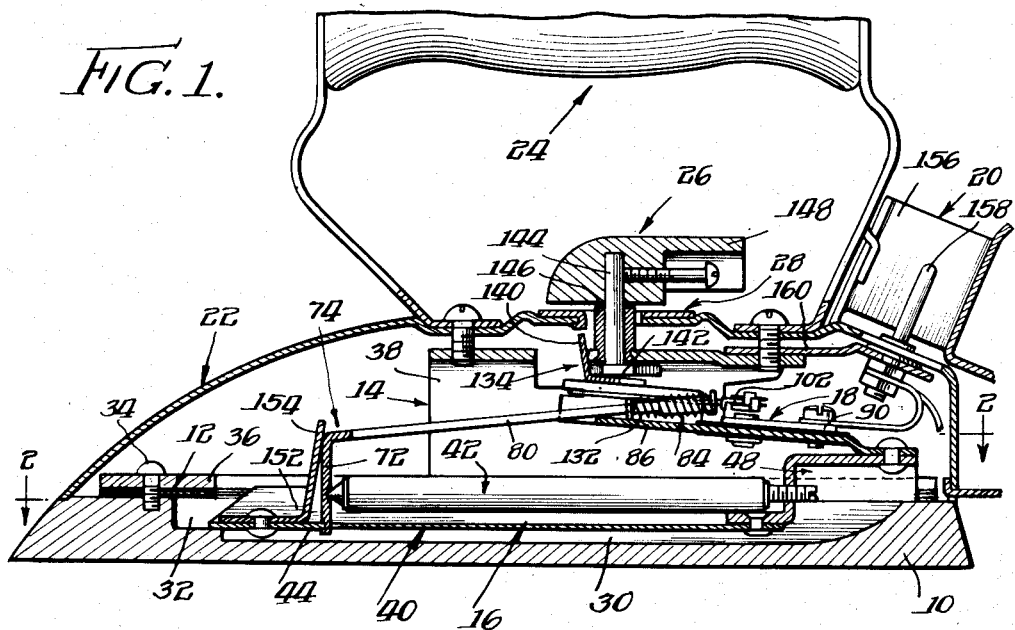
Inventor:- James J. Gough
By:- Cox & Moore attys.

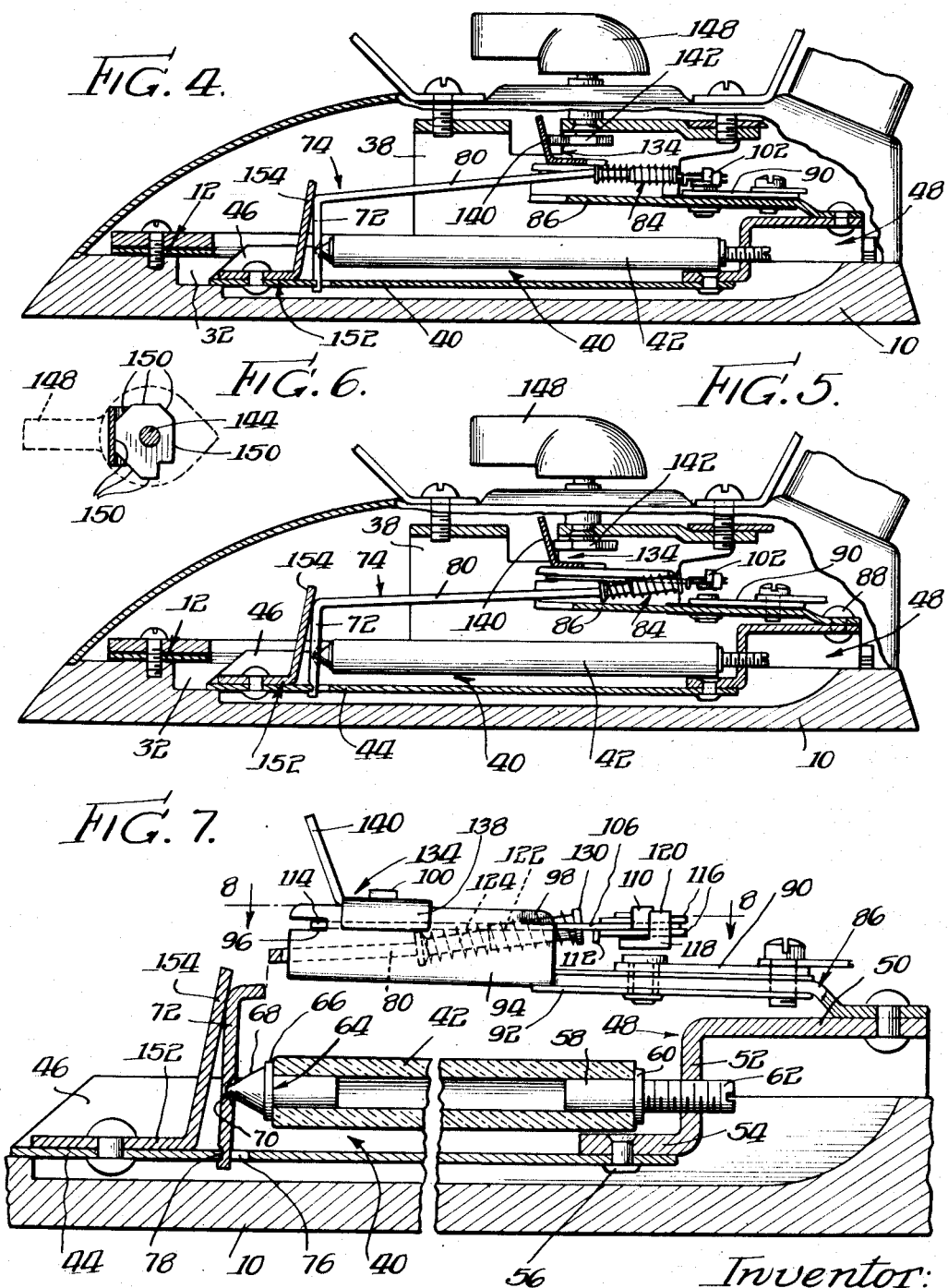

April 11, 1939.   J. J. GOUGH   2,154,043
THERMOSTATICALLY CONTROLLED ELECTRIC HEATING APPLIANCE
Filed Sept. 18, 1937   3 Sheets-Sheet 3
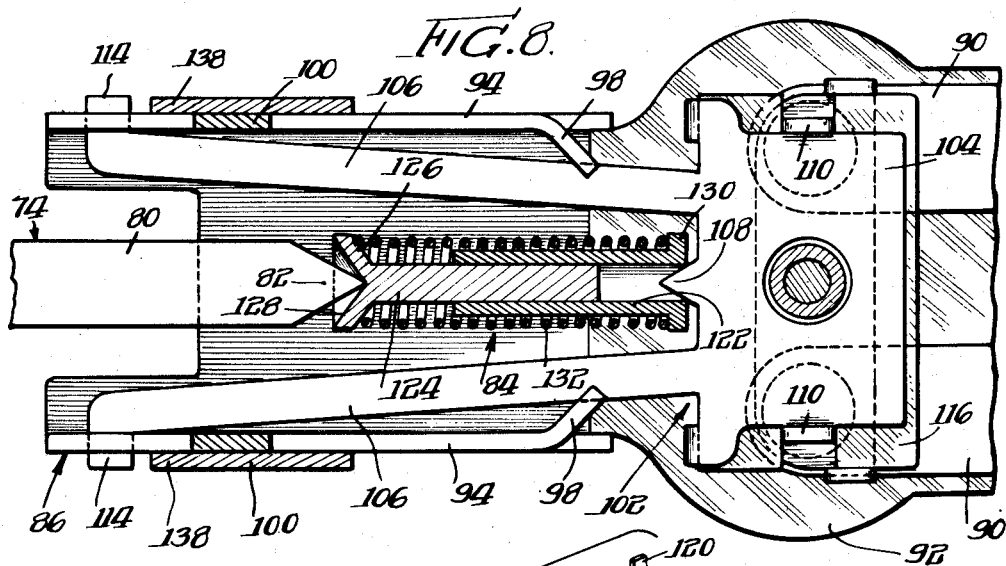
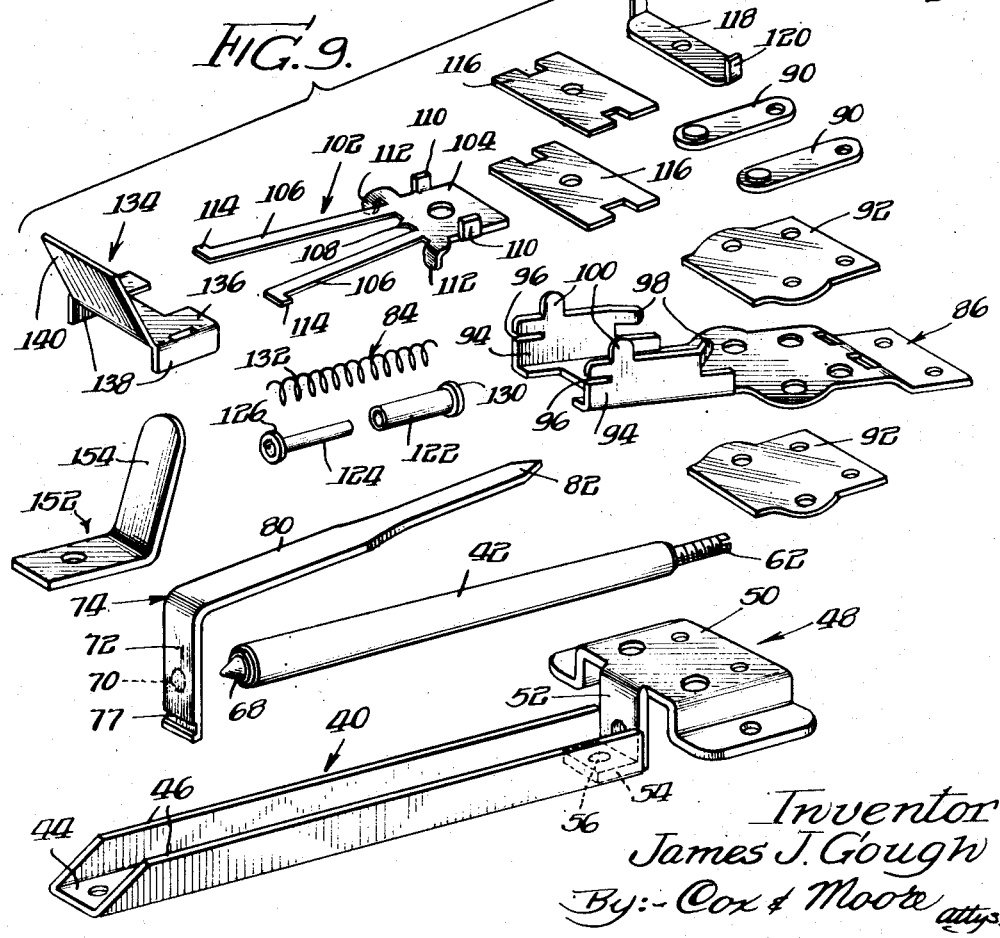
Inventor
James J. Gough
By:- Cox & Moore attys.

Patented Apr. 11, 1939

2,154,043

UNITED STATES PATENT OFFICE 2,154,043

THERMOSTATICALLY CONTROLLED ELECTRIC HEATING APPLIANCE

James J. Gough, Chicago, Ill., assignor to Chicago Electric Manufacturing Company, Chicago, Ill., a corporation of Illinois Application September 18, 1937, Serial No. 164,511

16 Claims. (Cl. 219—25)

This invention relates to a thermostat for electric heating appliances and more particularly to an electric flat-iron embodying a thermostat for automatically making and breaking the circuit to the flat-iron in response to variations in the temperature of the said iron.

Thermostatic circuit controls are particularly desirable in electric flat-irons and in many other types of similar electric heating appliances, such as electric cooking and baking devices. These controllers usually include a bi-metallic strip which changes in shape in response to variations in the temperature of the heated element and this change in shape is employed to operate a switch which determines the energization of the heating element.

Bi-metallic strips, even when supplied by the same manufacturer with nominally the same two elements in each strip, vary considerably in response to temperature changes because this response is affected to a considerable degree by extremely slight or minute variations in the thickness of the constituent strips, by the degree of purity of the two metals, and also by the variations in the pressures exerted during welding of the constituent strips to each other.

Moreover, when such bi-metallic strips are exposed to abnormally high temperatures, even for a short period of time, they become distorted in shape and do not return to their original shape when subsequently cooled. This distortion in shape destroys the adjustment of the thermostatic control device of which the bi-metallic strip forms the main part and in many instances renders such control devices substantially useless.

The difference in the coefficients of thermal expansion of the two constituent parts of the bi-metallic strip suitable for use at the temperature ranges of an electric flat-iron, as for example steel and copper or bronze, is relatively small, being between 25 and 30%. Such strips, when employed in electric irons, are necessarily short in length and it is accordingly difficult to obtain sufficient change in shape to insure the requisite spacing of the switch contacts when the circuit is open. A very delicate adjustment must be made at the time of manufacture to compensate for the variations in the original characteristics of such strips and this adjustment cannot be maintained even in normal use for the shape of the strip is affected by the pressure with which, in expanding, it exerts against a cooperating part to open the circuit. This pressure is usually applied at an end portion of the strip in a direction substantially at right angles to the body of the strip and the reaction to this pressure, therefore, tends to distort the shape of the strip.

In an attempt to overcome these operating difficulties it has been proposed to space the strips of different metals parallel to each other and to connect them rigidly at one end, the slight difference in expansion of the two strips being amplified by a lever mechanism associated with the free ends of the strips. Because this requires pivot connections of the lever or levers to each strip, it is difficult to avoid lost motion, and, in addition, the end thrust on one or both of the strips necessitates the use of considerably heavier metal. The original manufacturing adjustments of such devices cannot be made before the bi-metallic strips have been fastened to the flat-iron and the latter, therefore, interferes with the proper testing and adjusting of the thermostatic control device. In addition, the lost motion in the lever mechanism makes it difficult to maintain the proper adjustment.

Known thermostatic control devices of other types possess, in common with those of the bi-metallic type, certain inherent defects of operation, chiefly among which are their incapability of fine adjustment for response to different temperatures within their working range, the narrowness of the temperature range through which such devices may operate, and the relatively slow speed at which the control contacts are operated to open and close the electric circuit. The difficulty of fine adjustment makes it impossible to maintain the heating appliance at the precise temperature desired. The narrowness of the temperature range through which the thermostatic device may exert its controlling action makes it impossible to utilize the heating appliance throughout its own inherently wide temperature range and the slow speed of separation of the control contacts causes arcing between such contacts which shortens the life of the thermostatic control device and produces objectionable disturbances in the external circuit of the heating appliance.

In applicant's co-pending application, Serial No. 164,510, filed of even date herewith, an electric heating appliance embodying a thermostatic control device, eliminating many of these above recited defects of the prior art, has been disclosed. The present application pertains to and discloses an improvement over the device disclosed in said co-pending application for avoiding further defects of the prior art devices.

It is an object of this invention to provide an electric heating appliance embodying a thermostatic control device capable of fine adjustment to predetermine the precise temperature at which the thermostatic control device shall exert its controlling action.

Another important object of the invention is to provide a thermostatic control device for use with electric irons or similar heating appliances which shall be capable of performing its controlling action throughout a wide range of temperatures.

Another quite important object of applicant's invention is to provide in a thermostatic control device for electric irons or similar heating appliances, simple, compact and efficient means for quickly snapping the switch elements or contacts from one control position to another.

Other objects of the invention are to provide a compact and inexpensive thermostatic control device for electric irons or like heating appliances; to provide simple and durable toggle connections between the temperature responsive means and the control switch of the thermostatic control device; to provide simple and effective, directly acting resilient means for maintaining the several parts in proper operative relation; to provide simple, readily accessible, precisely adjustable means for adjusting the thermostatic control device for response to different desired temperatures; to provide a thermostatic control device embodying a metallic temperature responsive member and a vitreous temperature responsive member having a coefficient of expansion substantially different from that of the metallic member and housed substantially within the metallic member; and to provide means for amplifying the relative movement of the metallic and vitreous members and to cause said motion amplifying means to operate a toggle connection to snap the control switch into open and closed positions.

Numerous other objects and advantages will more fully appear during the course and progress of the following specification.

Referring to the drawings:

Fig. 1 is a longitudinal vertical section through a thermostatically controlled electric flat-iron, illustrating the invention, the parts of the thermostatic control device being shown in off position.

Fig. 2 is a plan view of the iron, certain parts being detached and others in section for purposes of illustration.

Fig. 3 is a fragmentary view in perspective of a portion of the adjusting or control device.

Fig. 4 is a longitudinal vertical section similar to Fig. 1, but showing the parts of the thermostatic control device in operating relation.

Fig. 5 is a view similar to Fig. 4 and illustrating the manner of operation of the thermostatic control device to open the switch contacts.

Fig. 6 is a detail view partly in section, showing the adjusting cam and its follower.

Fig. 7 is an enlarged fragmentary view of a portion of Fig. 5, certain of the parts being shown in section for purposes of illustration.

Fig. 8 is an enlarged fragmentary horizontal section taken substantially along the line 8—8 of Fig. 7.

Fig. 9 is an exploded view in perspective of the parts of the thermostatic control device.

As shown in Fig. 1 of the drawings, the embodiment selected to illustrate the invention comprises a heat applying member or sole plate 10, a heating element 12, a pressure or clamping plate 14, a thermostatic control unit 16 embodying a switch control unit 18, electric terminal means 20, a cover or shell 22, handle means 24, an adjusting device or control means 26, and an indicator or dial 28 associated with the adjusting device.

The heat applying member or sole plate 10 is of conventional shape, as shown in Fig. 2, and is provided with a peripheral recess, as shown in Figs. 1, 4 and 5, for receiving and positioning the shell 22. The sole plate is additionally provided with a central longitudinal groove or channel 30 terminating inwardly of the toe and heel of the sole plate and merging at its forward end into a depression or groove 32.

The heating element 12 may be of any conventional construction providing spaced apart legs to receive therebetween the thermostatic control unit 16. In the conventional manner the heating element is insulated from the sole plate 10 and the clamping plate 14 by suitable sheets of insulating material and is held in position on the sole plate by the clamping plate and by any suitable fastening means, such as screws 34 received in suitable threaded openings provided in the upper surface of the sole plate. The clamping plate 14 may be of any suitable or conventional structure providing a base plate 36 having spaced legs to receive the thermostatic control unit and an integral, generally U-shaped, body portion 38 forming a housing for the major portion of the thermostatic control unit and a support for the shell 22, the handle means 24 and a part of the terminal means 20.

The thermostatic control device comprises the metallic temperature responsive member 40 and a vitreous temperature responsive member 42. The temperature responsive member 40 comprises a thin strip of metal, preferably steel, bent to form a bottom wall 44 and side walls 46 providing a channel-shaped housing for the vitreous member 42. The vitreous member 42 comprises a tube of material having a coefficient of expansion in the range of 20–100° C.—$1.88 \times 10^{-6}$; 20–600° C. —$2.76 \times 10^{-6}$ and consisting chiefly of cordierite crystals ($2MgO—2Al_2O_3—5SiO_2$) and commonly known as "Alsimag 202."

The temperature responsive members 40 and 42 are secured to one end of the heat applying member or sole plate 10 by a bracket 48 having a top wall 50, a depending leg 52 and a forwardly projecting foot 54. The metallic temperature responsive member 40 may be fastened to the foot 54 of the bracket 48 in any desired manner, as for example by a rivet or rivets 56. The temperature responsive member 42 is preferably secured to the leg 52 of the bracket 48 by a suitable plug having a cylindrical portion 58 received within the internal bore of the member 42, a shoulder 60 abutting the rear edge of said member and a threaded shank 62 threadedly engaging a suitable opening provided in the leg 52. The outer or free end of the metallic strip or temperature responsive member 40 is slidably supported on the sole plate 10 within the depression or groove 32. The tube 42 at its free end carries a plug 64 having a cylindrical portion received within the internal bore of the tube, a shoulder 66 abutting the outer face of the tube and a frusto-conical tip 68. The frusto-conical tip 68 is adapted to engage within a frusto-conical recess or groove 70 provided in the depending arm 72 of a lever or motion amplifying means 74. The depending arm 72 of the lever 74 extends through an opening 76 provided in the bottom wall 44 of the temperature responsive member 40 and is provided with a transverse recess or groove 77 into which extends the forward edge 78 of the opening 76, as best shown in Fig. 7. The other arm 80 of the lever 74 extends toward the heel of the sole plate and is provided with a tapering and pointed end portion 82 for connecting the lever to a toggle connection 84 later to be described.

The switch control unit 18 is supported on the top wall 50 of the bracket 48 and comprises a relatively fixed, though adjustable, spring steel contact member 86 secured to the wall 50 by rivets 88. A pair of switch contacts or blades 90 are secured to the opposite surface of the contact member 86 by suitable insulated rivets, the blades 90 being insulated from the contact member 86 by suitable strips or blocks 92 of any desired insulating material. At its outer end the contact member 86 is provided with opposite, upstanding flanges 94 having aligned recesses or grooves 96 extending inwardly from their outer edges and being provided with inwardly turned lugs 98 and upstanding lugs 100. A movable switch blade 102 is provided with a main body portion 104, a pair of forwardly projecting, spaced legs 106, a V-shaped protuberance 108 projecting centrally between the legs 106, a pair of upstanding lugs 110 centrally of the body portion 104, and lugs 112 projecting downwardly from the inner edge of said body portion. The movable switch blade 102 is pivotally connected to the contact member 86 by lugs 114 extending outwardly from the outer ends of the legs 106 and being loosely received within the recesses or grooves 96 in said member 86. The upstanding lugs 110 and the downwardly depending lugs 112 provide means for securing to the main body 104 of the switch blade 102 a pair of insulating strips or blocks 116 and a metal contact strip 118 insulated from the main body portion by said insulating strips. The metal contact strip 118 is provided with upstanding lugs 120 which may be bent over the top insulating strip 116 to secure said contact strip to the switch blade 102. An insulated rivet 121 passes loosely through an enlarged opening in the body portion 104 of the blade 102 and through the insulating strips 116 and the contact strip 118.

The toggle connection 84 pivotally connects the switch blade 102 to the lever 74 and this connection comprises a tube or cylinder 122 and a pin 124 telescopically interfitting within the tube 122 as best shown in Fig. 8. The pin 124 is provided with an enlarged head 126 having a frusto-conical opening or recess 128 adapted to receive the pointed end portion 82 of the lever 74 and thereby pivotally connect said pin to said lever. The V-shaped protuberance 108 which projects forwardly from the body portion 104 of the switch blade 102, loosely fits within the internal bore of the tube 122 and thereby pivotally connects said tube to said switch blade. This tube 122 is provided with an enlarged head 130 and a helical spring 132 surrounds the tube 122 and the pin 124 and is interposed between and held in place by the enlarged heads 126 and 130. The lugs 98 which extend inwardly from the opposed flanges 94 of the contact member 86 are bent over the legs 106 of the switch blade 102 and provide means for limiting the movement of said blade relative to the contact member 86.

A cam follower 134, best shown in Fig. 9, comprises a base portion 136, opposed depending flanges 138, and an upwardly inclined wall or cam surface 140. This cam follower 134 is secured to the contact member 86 by the lugs 100 which are adapted to pass through suitable openings provided in the base 136 of the cam follower and are bent over to fixedly secure the latter to the contact member 86.

The cam follower 134 forms one part of the adjusting device or control means 26 which comprises, in addition, a cam 142 secured to the lower end of a pin or stud 144 journaled in a suitable bushing 146 secured to the body portion 38 of the pressure or clamping plate 14. A manually operable knob 148 is secured to the upper end of the stud 144 in any suitable manner for rotation therewith and is formed to provide an indicator or pointer adapted to cooperate with the indicator or dial 28. The cam 142 may be of any desired type or configuration. As illustrated, this cam comprises a disk having a plurality of plane faces 150 spaced at different radii from the axis of the stud 144, as best shown in Fig. 6. The indicator or dial 28 may be of any desired type or kind but preferably comprises a thin disk carrying suitable temperature indicia on its upper surface. This dial may be secured to the shell 22 within a suitable circular recess or groove provided therefor by an integral lug extending downwardly therefrom and clampingly engaging the edge of the opening through which pass the stud 144 and the bushing 146.

A bracket 152, which may possess a certain degree of resiliency, is secured to the bottom wall 44 of the temperature responsive member adjacent the free end of the latter and is provided with an upwardly inclined flange or arm 154 adapted to engage the outer surface of the lever 74 substantially at the bend therein to thereby limit the movement of the lever 74 relative to the temperature responsive members 40 and 42 under the action of the spring 132.

The electric terminal means 20 comprises the usual guard or housing 156 secured to the shell 22 and the terminal prongs 158 supported in the customary manner by a plate 160 secured to the body portion 38 of the pressure or clamping plate 14.

In the off position of the adjusting device or control means 26, the elements of the thermostatic control unit and associated parts assume the position shown in Fig. 1 in which the contact member 86 and the switch blade 102 are in their uppermost position and the cam surface 140 of the cam follower 134 passes through an opening 162 provided therefor in the body portion 38 of the pressure or clamping plate 14. In this position the plane face 150 of the cam 142 which is at the least radial distance from the center of the stud 144, engages the cam follower 134 and it will be observed that in this position the contact strip 118 is out of engagement with the switch contacts 90 and the circuit to the heating element is accordingly broken.

The operation of the embodiment illustrated is as follows. In order to energize the heating element, suitable connections having been completed to the terminal prongs 158, the manually operable knob 148 is rotated to align the point thereof with the indicia representing the desired temperature and to simultaneously rotate the cam 142. The cam 142, in rotating, applies a force to the cam follower, a component of which force extends parallel to the cam surface 140 and forces the switch blade 102 and contact member 86 attached to the cam follower downwardly or in a counter-clockwise direction, as seen in Figs. 1, 4, 5 and 7. The lever 74 remains stationary as the switch blade 102 moves downwardly. In the initial stages of movement, the spring 132 of the toggle connection is compressed as the fulcrum point provided by the protuberance 108 of the switch blade approaches the fulcrum point provided by the end portion 82 of the lever 74. As the concentric axis of the tube 122 and pin 124 passes from one side of the axis of the arm 80 of the lever 74 to the other side of said axis, the spring 132 quickly expands and with a snap action forces the blade 102 downwardly relative to the contact member 86 thereby forcing the contact strip 118 into engagement with the contacts 90, the latter of which are, in the conventional manner, connected in one lead of the heating element, the other lead of which passes directly from the heating element directly to the other terminal 158.

As the temperature of the heat applying member or sole plate 10 rises, the temperature responsive members 40 and 42 expand linearly, the metallic member 40 expanding at a considerably greater rate than the vitreous member 42. As the lower end of the arm 72 of the lever 74 moves to the left relative to the plug 64, the resilient arm 154 causes the lever 74 to rotate in a clockwise direction about the tip 68 as a fulcrum point.

During this movement of the lever 74, the switch blade 102 will remain stationary and the end 82 of the lever 74 will approach the protuberance 108 of the switch blade thereby compressing the spring 132. When the desired temperature is reached, the axis of the arm 80 of the lever 74 will pass from one side to the other of the concentric axis of the tube 122 and pin 124 and the spring 132, in suddenly expanding, will snap the contact strip 118 away from the switch contact 90 thereby breaking the circuit to the heat element.

As the heat applying member or sole plate 10 cools, the temperature responsive member 40 will contract at a greater rate than the temperature responsive member 42 and the lever 74 will be rotated in the opposite or counter-clockwise direction to snap closed the contacts 118 and 90.

It will be readily apparent that the position of the contact member 86 which is subject to the very fine adjustment provided by the cam 142, will determine the temperature at which the circuit will be opened.

It will be seen from the above description that applicant has provided a particularly simple and efficient thermostatic control device for use with electric irons or similar heating appliances which is capable of fine adjustment, of performing its controlling action throughout a wide range of temperatures and which is compact and efficient and quickly snaps the switch elements or contacts from one control position to another.

It is thought that the invention and numerous of its attendant advantages will be understood from the foregoing description and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention.

Having thus described my invention, what I claim as new and desire to secure by Letters Patent of the United States is as follows:

1. In an electric heating appliance having a heat applying member, a heating element, a supply circuit for said heating element, and a thermostatic control device comprising linearly expanding members having dissimilar coefficients of expansion, means for fixedly securing corresponding ends of said linearly expanding members against movement relative to said heat applying member, the opposite ends of said expanding members being shiftably supported on said heat applying member, means having a plurality of operative positions for controlling the energization of said supply circuit and means responsive to the difference in expansion of said linearly expanding members and comprising a toggle mechanism operatively associated with said linearly expanding members and said controlling means for snapping said controlling means from one operative position to the other.

2. In an electric heating appliance as defined in claim 1 in which means are provided for adjusting the controlling means to predetermine the temperature at which said controlling means shall be operated by said linearly expanding members to control the supply circuit.

3. In an electric heating appliance having a heat applying member, a heating element and a supply circuit for said heating element, a thermostatic control device comprising a linearly expandable vitreous member, a linearly expandable metallic member forming a housing for said vitreous member, said metallic and vitreous members having dissimilar temperature coefficients of expansion and each being fixedly secured at one end to said heat applying member, the opposite end of one of said members being shiftably supported on said heat applying member and the corresponding end of said other member being shiftably mounted on the first member, motion amplifying means responsive to the relative movement between said metallic and vitreous members, switch means for controlling said supply circuit, and a toggle mechanism actuated by said motion amplifying means for snapping said switch means from one operative position to another.

4. In an electric heating appliance having a heat applying member, a heating element and a supply circuit for said heating element, a thermostatic control device comprising a linearly expandable vitreous member, a linearly expandable metallic member, said metallic and vitreous members having dissimilar temperature coefficients of expansion and each being fixedly secured at one end to said heat applying member, the opposite end of one of said members being shiftably supported on said heat applying member and the corresponding end of said other member being shiftably mounted on the first member, motion amplifying means responsive to the relative movement between said metallic and vitreous members, switch means for controlling said supply circuit, a toggle mechanism actuated by said motion amplifying means for snapping said switch means from one operative position to another, said toggle mechanism comprising telescopically interfitting members connecting said shiftable means to the movable element of said switch means, and spring means constantly urging said interfitting members in opposite directions.

5. In an electric heating appliance having a heat applying member, a heating element, a supply circuit for said heating element, and a thermostatic control device, said device comprising linearly expanding metallic and vitreous members having dissimilar coefficients of expansion, supporting means for fixedly securing one end of each of said metallic and vitreous members against movement relative to the heat applying member, the opposite end of one of said metallic and vitreous members being shiftably supported on said heat applying member, switch means carried by said supporting means and having a plurality of operative positions for controlling the energization of said supply circuit, lever means responsive to the difference in expansion of said metallic and vitreous members, said lever means being operatively connected to the shiftably supported one of the metallic and vitreous members and fulcrumed on the other of said members, said lever means including a toggle mechanism operatively connected to said switch means for snapping said switch means from one operative position to another, and means for adjusting said switch means to predetermine the temperature at which said lever means shall operate said switch means.

6. In an electric heating appliance having a heat applying member, a heating element and a supply circuit for said heating element, a thermostatic control device comprising metallic and vitreous members having dissimilar coefficients of expansion and disposed in proximity to the heat applying member, means for fixedly securing one end of each of the metallic and vitreous members relative to the heat applying member, shiftable means associated with the other ends of the metallic and vitreous members and responsive to the difference in expansion of said members, switch means for controlling said supply circuit, a toggle mechanism connecting said shiftable means to said switch means for snapping said switch means from one operative position to the other, and cam means for adjusting said switch means relative to said shiftable means to predetermine the temperature at which said metallic and vitreous members shall cause operation of said switch means.

7. In an electric heating appliance having a heat applying member, a heating element and a supply circuit for said heating element, a thermostatic control device comprising a linearly expandable vitreous member, a linearly expandable metallic member forming a housing for said vitreous member, said metallic and vitreous members having dissimilar temperature coefficients of expansion and each being fixedly secured at one end to said heat applying member, the opposite end of one of said members being shiftably supported on said heat applying member and the corresponding end of said other member being shiftably mounted on the first member, motion amplifying means responsive to the relative movement between said metallic and vitreous members, switch means for controlling said supply circuit, a toggle mechanism actuated by said motion amplifying means for snapping said switch means from one operative position to another, a cam follower carried by said switch means, and a manually rotatable cam engaging said follower for adjusting said switch means relative to said motion amplifying means to predetermine the temperature at which said metallic and vitreous members shall cause operation of said switch means.

8. In an electric heating appliance having a heat applying member, a heating element and a supply circuit for said heating element, a thermostatic control device comprising linearly expanding members having dissimilar coefficients of expansion, means for fixedly securing one end of each of said linearly expanding members relative to the heat applying member, the other end of each of said linearly expanding members being shiftably supported relative to said heat applying member, a switch control unit having a relatively fixed contact member and a relatively movable contact member pivoted to said fixed contact member, lever means responsive to the difference in expansion of said members, a toggle connection between said lever means and said relatively movable contact member for snapping said last mentioned member into and out of engagement with said fixed contact member, a cam follower carried by said relatively fixed contact member, and a manually rotatable cam engaging said follower for adjusting the fixed contact member relative to said lever means to predetermine the temperature at which said linearly expanding members shall cause operation of said relatively movable contact member.

9. In an electric heating appliance having a heat applying member, a heating element and a supply circuit for said heating element, a thermostatic control device comprising linearly expanding metallic and vitreous members having dissimilar coefficients of expansion, means for fixedly securing one end of each of said linearly expanding members relative to the heat applying member, the other end of each of said linearly expanding members being shiftably supported relative to said heat applying member, a switch control unit having a relatively fixed contact member and a relatively movable contact member pivoted to said fixed contact member, a lever pivoted on said vitreous member and operatively connected to said metallic member, said lever having a free end portion extending beyond said vitreous and metallic members, telescopically interfitting members pivotally connected to the free end of said lever and to the relatively movable contact member, and spring means constantly urging said interfitting members in opposite directions and cooperating with said interfitting members to snap said relatively movable contact member into and out of engagement with said fixed contact member.

10. In an electric heating appliance having a heating element and a supply circuit for said heating element, a thermostatic control device comprising linearly expanding metallic and vitreous members having dissimilar coefficients of expansion, a switch control unit having a relatively fixed contact member and a relatively movable contact member pivoted to said fixed contact member, a lever pivoted on said vitreous member and operatively connected to said metallic member, said lever having a free end portion extending beyond said vitreous and metallic members, telescopically interfitting members pivotally connected to the free end of said lever and to the relatively movable contact member, spring means constantly urging said interfitting members in opposite directions and cooperating with said interfitting members to snap said relatively movable contact member into and out of engagement with said fixed contact member, a cam follower carried by the relatively fixed contact member, and a manually rotatable cam engaging said follower for adjusting the fixed contact member relative to said lever to predetermine the temperature at which the metallic and vitreous members shall cause operation of the relatively movable contact member.

11. In an electric heating appliance having a heat applying member, a heating element and a supply circuit for said heating element, a thermostatic control device comprising linearly expanding members having dissimilar coefficients of expansion, means for fixedly securing one end of each of said linearly expanding members relative to the heat applying member, the other end of each of said linearly expanding members being shiftably supported relative to said heat applying member, means having a plurality of operative positions for controlling the energization of said supply circuit, and means responsive to the difference in expansion of said members for snapping said control means from one operative position to the other at predetermined temperatures.

12. In an electric heating appliance having a heat applying member, a heating element and a supply circuit to said heating element, a thermostatic control device comprising temperature responsive members having dissimilar coefficients of expansion and disposed in proximity to the heat applying member, means for fixedly securing one end of each of the temperature responsive members relative to the heat applying member, shiftable means associated with the other ends of said temperature responsive members and jointly responsive to the difference in expansion of said members, switch means for controlling said supply circuit and a toggle mechanism connecting said shiftable means to said switch means for snapping said switch means from one operative position to the other.

13. In an electric heating appliance having a heat applying member, a heating element and a supply circuit for said heating element, a thermostatic control device comprising an expandable member and a relatively non-expandable member, said last mentioned members each being fixedly secured at one end to said heat applying member, the free end of one of said members being shiftably supported on said heat applying member, means connecting the free end of the other member to the first mentioned member for amplifying the relative movement between said members, switch means for controlling said supply circuit, a toggle mechanism actuated by said amplifying means for snapping said switch means from one operative position to another, said toggle mechanism comprising telescopically interfitting members connecting said shiftable means to the movable element of said switch means, and spring means constantly urging said interfitting members in opposite directions.

14. In an electric heating appliance having a heat applying member, a heating element and a supply circuit for said heating element, a thermostatic control device comprising a linearly expandable member and a substantially non-expandable member, each of said last mentioned members being fixedly secured at one end to said heat applying member, the free end of the expandable member being shiftably supported on said heat applying member, a lever fulcrumed on the free end of the substantially non-expandable member and connected to the expandable member for amplifying the relative movement of said members, means having a plurality of operative positions for controlling the energization of said supply circuit, and means actuated by said lever for snapping said control means from one operative position to the other at predetermined temperatures.

15. In an electric iron, a sole plate having a longitudinally extending groove, a heating element secured to said sole plate, said heating element having a slot therein in alinement with the groove in the sole plate, and a thermostatic control device detachably mounted as a unit on said sole plate, said thermostatic control device comprising a channel shaped, linearly expansible, metallic member extending through said slot and in said groove, a substantially non-expansible tube housed within said channel shaped member, a bracket detachably secured to said sole plate and secured to one end of said channel shaped member, means for adjustably securing the corresponding end of said tube to said bracket, the opposite end of said channel shaped member being shiftably supported within the groove in the sole plate, a lever fulcrumed intermediate its ends upon said tube and operatively engaging at one end said channel shaped member, a supply circuit for said heating element, a switch in said circuit, said switch comprising a first switch member secured to said bracket and overlying said channel shaped member in said tube, and a second switch member shiftably supported on said first switch member for cooperation therewith to make and break said circuit, a toggle mechanism including relatively shiftable, interfitting members connected to said second switch member and to the other end of said lever, and resilient means for urging said interfitting members in opposite directions to snap said second switch member into and out of engagement with said first switch member as said lever is actuated by, and in response to, the expansion and contraction of said channel shaped metallic member.

16. In an electric iron, a sole plate having a longitudinally extending groove, a heating element secured to said sole plate, said heating element having a slot therein in alinement with the groove in the sole plate, detachable means for clamping said heating element to said sole plate, and a thermostatic control device detachably mounted as a unit on said sole plate, said thermostatic control device comprising a channel shaped, linearly expansible, metallic member extending through said slot and in said groove, a substantially non-expansible tube housed within said channel shaped member, a bracket detachably secured to said sole plate and secured to one end of said channel shaped member, means for adjustably securing the corresponding end of said tube to said bracket, the opposite end of said channel shaped member being shiftably supported within the groove in the sole plate, a lever fulcrumed intermediate its ends upon said tube and operatively engaging at one end said channel shaped member, a supply circuit for said heating element, a switch in said circuit, said switch comprising a first switch member secured to said bracket and overlying said channel shaped member in said tube, and a second switch member shiftably supported on said first switch member for cooperation therewith to make and break said circuit, a toggle mechanism including relatively shiftable, interfitting members connected to said second switch member and to the other end of said lever, resilient means for urging said interfitting members in opposite directions to snap said second switch member into and out of engagement with said first switch member as said lever is actuated by, and in response to, the expansion and contraction of said channel shaped metallic member, and cooperating cam means carried by said clamping means and said first switch member for adjusting the switch to predetermine the temperatures at which the thermostatic control device shall operate to control the heating element.

JAMES J. GOUGH.